United States Patent
Hasuo

(10) Patent No.: US 8,369,409 B2
(45) Date of Patent: Feb. 5, 2013

(54) MOTION VECTOR DETECTION APPARATUS AND METHOD, MOVING PICTURE ENCODING APPARATUS AND METHOD, AND MOVING PICTURE DECODING APPARATUS AND METHOD

(75) Inventor: Satoshi Hasuo, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 159 days.

(21) Appl. No.: 12/735,560

(22) PCT Filed: Jan. 9, 2009

(86) PCT No.: PCT/JP2009/050209
§ 371 (c)(1),
(2), (4) Date: Jul. 27, 2010

(87) PCT Pub. No.: WO2009/096214
PCT Pub. Date: Aug. 6, 2009

(65) Prior Publication Data
US 2010/0322315 A1 Dec. 23, 2010

(30) Foreign Application Priority Data
Jan. 31, 2008 (JP) ................................ 2008-020790

(51) Int. Cl.
*H04N 7/12* (2006.01)
(52) U.S. Cl. ................................. 375/240.16
(58) Field of Classification Search ............. 375/240.16, 375/240.17
See application file for complete search history.

(56) References Cited

U.S. PATENT DOCUMENTS

| | | | | |
|---|---|---|---|---|
| 5,351,083 | A | * | 9/1994 | Tsukagoshi ................ 348/384.1 |
| 5,418,570 | A | * | 5/1995 | Ueno et al. ................ 375/240.14 |
| 5,703,651 | A | * | 12/1997 | Kim et al. ................ 375/240.13 |
| 5,731,840 | A | * | 3/1998 | Kikuchi et al. ........... 375/240.16 |
| 5,734,431 | A | * | 3/1998 | Dachiku et al. ............ 348/415.1 |
| 5,751,364 | A | * | 5/1998 | Yasuda et al. ............ 375/240.16 |
| 5,768,438 | A | * | 6/1998 | Etoh ............................ 382/251 |
| 5,886,742 | A | * | 3/1999 | Hibi et al. ................ 375/240.16 |
| 5,923,786 | A | * | 7/1999 | Murayama .................... 382/242 |

(Continued)

FOREIGN PATENT DOCUMENTS

| | | |
|---|---|---|
| JP | 2000-115776 A | 4/2000 |
| JP | 2001078197 A | 3/2001 |

(Continued)

OTHER PUBLICATIONS

"Kaitei-ban H.264/AVC Kyokasho (H.264/AVC Textbook revised version)", supervised by Sakae Ohkubo, published by Inpress NetBusiness Company Co., Jan. 2006, pp. 113-119.

*Primary Examiner* — David Czekaj
*Assistant Examiner* — Kehinde O Abimbola
(74) *Attorney, Agent, or Firm* — Rabin & Berdo, P.C.

(57) ABSTRACT

A motion vector detection apparatus that obtains, for each of the blocks of a predetermined size into which one frame is divided, motion vector information in units of a plurality of partitions of differing rectangular shapes and differing sizes, up to the size of the blocks, has a partition connector means (23) that, when motion vectors for a plurality of partitions are obtained for one of the blocks, decides whether or not to connect a plurality of the partitions for which the motion vectors are obtained, and if the partitions are connected, includes motion vector information about the resulting connected partition in the motion vector information output from the motion vector detection apparatus. The motion vector encoding rate can be reduced.

6 Claims, 11 Drawing Sheets

U.S. PATENT DOCUMENTS

| | | | |
|---|---|---|---|
| 6,025,881 A * | 2/2000 | Kikuchi et al. | 375/240.18 |
| 6,031,582 A * | 2/2000 | Nishikawa et al. | 348/699 |
| 6,188,796 B1 * | 2/2001 | Kadono | 382/243 |
| 6,188,798 B1 * | 2/2001 | Lee | 382/251 |
| 6,298,086 B1 * | 10/2001 | Suzuki | 375/240.16 |
| 7,356,082 B1 * | 4/2008 | Kuhn | 375/240.16 |
| 7,573,939 B2 * | 8/2009 | Kondo et al. | 375/240.16 |
| 7,843,995 B2 * | 11/2010 | Bhaskaran et al. | 375/240.13 |
| 2004/0047421 A1 * | 3/2004 | Kato et al. | 375/240.16 |
| 2005/0232361 A1 * | 10/2005 | Nakaya et al. | 375/240.17 |
| 2007/0047652 A1 * | 3/2007 | Maruyama et al. | 375/240.16 |
| 2007/0092009 A1 * | 4/2007 | Muraki | 375/240.16 |
| 2008/0056370 A1 * | 3/2008 | Nakaya et al. | 375/240.16 |
| 2008/0117972 A1 * | 5/2008 | Ramachandran et al. | 375/240.16 |
| 2008/0130751 A1 * | 6/2008 | Kobayakawa et al. | 375/240.16 |
| 2008/0165855 A1 * | 7/2008 | Wang et al. | 375/240.16 |
| 2008/0198931 A1 * | 8/2008 | Chappalli et al. | 375/240.16 |
| 2008/0304569 A1 * | 12/2008 | Lee et al. | 375/240.16 |
| 2009/0141802 A1 * | 6/2009 | Tetsukawa et al. | 375/240.16 |

FOREIGN PATENT DOCUMENTS

| | | |
|---|---|---|
| JP | 2005-012439 A | 1/2005 |
| JP | 2005295424 A | 10/2005 |
| JP | 2006270294 A | 10/2006 |
| JP | 2007060164 A | 3/2007 |

* cited by examiner

FIG.4(A) mb_type 0, 16×16

FIG.4(B) mb_type 1, 16×8

FIG.4(C) mb_type 2, 8×16

FIG.4(D) mb_type 3, 8×8

FIG.4(E) sub_mb_type 0, 8×8

FIG.4(F) sub_mb_type 1, 8×4

FIG.4(G) sub_mb_type 2, 4×8

FIG.4(H) sub_mb_type 3, 4×4

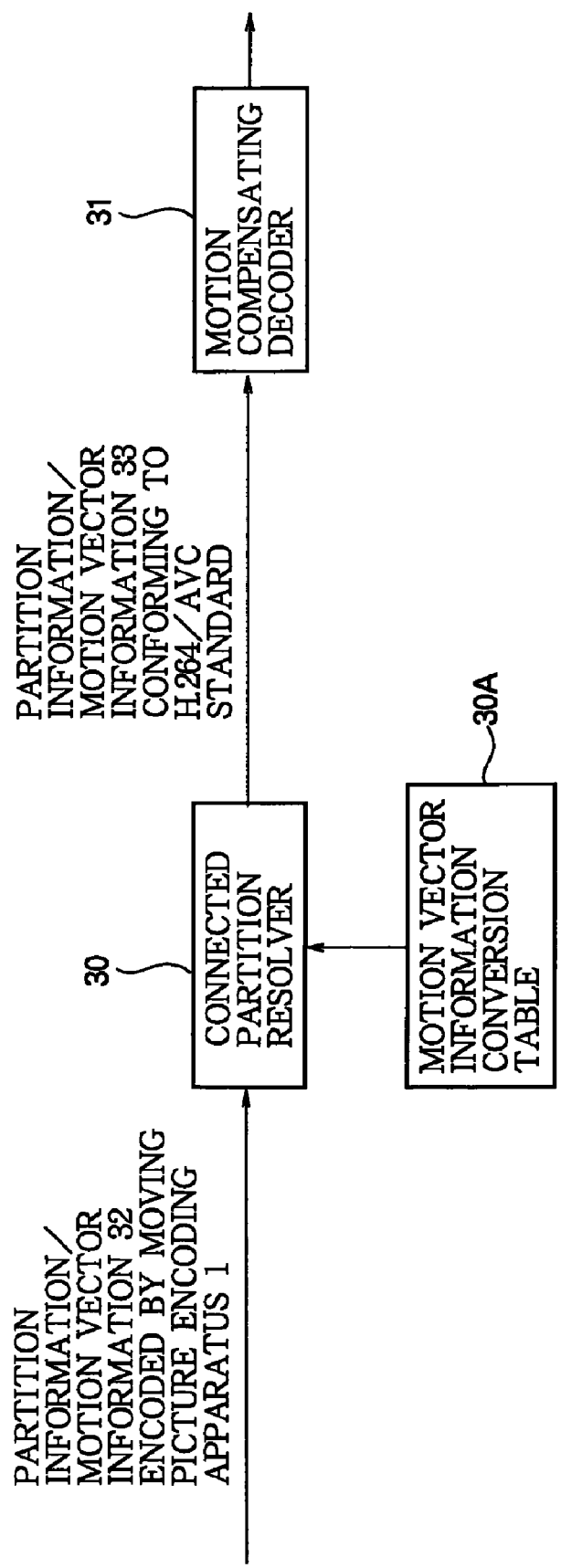

FIG.9

MOTION VECTOR INFORMATION
(INPUT INFORMATION) 34 ENCODED
BY MOVING PICTURE ENCODING
APPARATUS 1

| mb_type : 3 | ref_idx0 : 0 | mv0 : MV1 | mv1 : MV2 |
|---|---|---|---|

MOTION VECTOR INFORMATION
(OUTPUT INFORMATION) 35
CONFORMING TO H.264/AVC
STANDARD

| mb_type : 3 | sub-mb type : 2,2,2,2 | ref_idx0 : 0 | ref_idx1 : 0 | ref_idx2 : 0 | ref_idx3 : 0 |
|---|---|---|---|---|---|

| mv0 : MV1 | mv1 : MV2 | mv2 : MV2 | mv3 : MV1 | mv4 : MV1 | mv5 : MV2 | mv6 : MV2 | mv7 : MV1 |
|---|---|---|---|---|---|---|---|

| mb_type: | STANDARD mb_type: | STANDARD sub_mb_type: | | | STANDARD pt1 MOTION VECTOR | STANDARD pt2 MOTION VECTOR | STANDARD pt3 MOTION VECTOR | STANDARD pt4 MOTION VECTOR | STANDARD pt5 MOTION VECTOR | STANDARD pt6 MOTION VECTOR | STANDARD pt7 MOTION VECTOR | STANDARD pt8 MOTION VECTOR |
|---|---|---|---|---|---|---|---|---|---|---|---|---|
| | | 0 | 1 | 2 | | | | | | | | |
| 8 | 3 | 2 | 2 | 3 | PTA MOTION VECTOR | PTB MOTION VECTOR | PTB MOTION VECTOR | PTA MOTION VECTOR | PTA MOTION VECTOR | PTB MOTION VECTOR | PTB MOTION VECTOR | PTA MOTION VECTOR |
| | | 2 | 2 | 2 | | | | | | | | |

(TBY1) (TBY2) (TBY3)

36 — INFORMATION CORRESPONDING TO PARTITION INFORMATION/MOTION VECTOR INFORMATION ENCODED BY MOVING PICTURE ENCODING APPARATUS 1

37, 38 — INFORMATION CORRESPONDING TO PARTITION INFORMATION/MOTION VECTOR INFORMATION CONFORMING TO H.264/AVC STANDARD

MOTION VECTOR DETECTION APPARATUS AND METHOD, MOVING PICTURE ENCODING APPARATUS AND METHOD, AND MOVING PICTURE DECODING APPARATUS AND METHOD

FIELD OF THE INVENTION

The present invention relates to a motion vector detection apparatus and method, a moving picture encoding apparatus and method, and a moving picture decoding apparatus and method, capable of, for example, encoding and decoding moving pictures based on the H.264/AVC (Advanced Video Coding) standard.

BACKGROUND ART

The H.264/AVC standard and many other moving picture encoding systems employ a motion compensation method in which an image (one frame) is divided into a plurality of blocks and the motion of each block in relation to a previously encoded image is estimated. As the block size is reduced, more precise motion estimation becomes possible, but the encoding rate increases because motion vector information must be encoded for each block.

For this reason, the H.264/AVC standard employs a strategy (variable block size motion compensation) in which the block (referred to below as partition) size that is used is switched by selecting the optimal block size from among several motion compensation block sizes, (see non-patent document 1).

Non-patent document 1: "Kaitei-ban H.264/AVC Kyokasho (H.264/AVC TEXTBOOK revised version)", supervised by Sakae Ohkubo, published by Inpress NetBusiness Company Co., January, 2006, pp. 113 to 119

DISCLOSURE OF THE INVENTION

Problems to be Solved by the Invention

Motion compensation based on the variable block size H.264/AVC standard can reduce the encoding rate only to a limited extent because whenever a partition of the optimal size is selected and its motion vector is obtained, the motion vector information for the partition is encoded, so even if there are other partitions nearby that have motion vectors that could be regarded as the same, motion vector information has to be encoded for each of the partitions.

Accordingly, there is a need for a motion vector detection apparatus and method that can further reduce the amount of encoded motion vector information. There is also a need for a moving picture encoding apparatus and method using this type of motion vector detection apparatus or method. A further need is for a moving picture decoding apparatus and method compatible with this type of moving picture encoding apparatus and method.

Means of Solution of the Problems

The first invention is a motion vector detection apparatus that obtains, for each of the blocks of a predetermined size into which one frame is divided, motion vector information in units of a plurality of partitions of differing rectangular shapes and differing sizes, up to the size of the blocks, comprising a partition connector that, when motion vectors for a plurality of partitions are obtained for one of the blocks, decides whether or not to connect a plurality of the partitions for which the motion vectors are obtained, and if the partitions are connected, includes motion vector information about the resulting connected partition in motion vector information output from the motion vector detection apparatus.

The second invention is a motion vector detection method that obtains, for each of the blocks of a predetermined size into which one frame is divided, motion vector information in units of a plurality of partitions of differing rectangular shapes and differing sizes, up to the size of the blocks, wherein when motion vectors for a plurality of partitions are obtained for one of the blocks, a partition connector decides whether or not to connect a plurality of the partitions for which motion vectors are obtained, and if the partitions are connected, includes motion vector information about the resulting connected partition in motion vector information that is output.

The third invention is a moving picture encoding apparatus that has a motion vector detection apparatus and encodes a moving picture according to a motion compensated inter-frame encoding method, wherein the first invention is used as the motion vector detection apparatus.

The fourth invention is a moving picture encoding method that includes a motion vector detection step performed by a motion vector detection apparatus and encodes a moving picture according to a motion compensated inter-frame encoding method, wherein the motion vector detection step uses the motion vector detection method of the second invention.

The fifth invention is a moving picture decoding apparatus that performs moving picture decoding processing based on encoded information provided by the moving picture encoding apparatus of the third invention, comprising a motion compensation decoding means for performing decoding with motion compensation based on the motion vector information, and a connected partition resolving means for deciding whether or not motion vector information included in the received encoded information is for a connected partition, and if the motion vector information is for a connected partition, for restoring the motion vector information to motion vector information before connection of the partition and supplying the resulting motion vector information to the motion compensation decoding means.

The sixth invention is a moving picture decoding method that performs moving picture decoding processing based on input encoded information, comprising a motion compensation decoding step for performing decoding with motion compensation based on motion vector information, and a connected partition resolving step for deciding whether or not motion vector information included in the received encoded information is for a connected partition, and if the motion vector information is for a connected partition, for restoring the motion vector information to motion vector information before connection of the partition and supplying the resulting motion vector information to the motion compensation decoding means.

Effect of the Invention

The present invention enables the motion vector encoding rate to be reduced more than before.

BRIEF DESCRIPTION OF THE DRAWINGS

FIGS. 4(A) to 4(H) are drawings illustrating combinations of partitions in the first embodiment.

FIG. 8 is a block diagram illustrating the main structure of the moving picture decoding apparatus in the first embodiment.

FIG. 9 is a drawing illustrating motion vector information (input information) 34 encoded by the moving picture encoding apparatus 1.

FIG. 10 is a drawing illustrating motion vector information (output information) 35 conforming to the H.264/AVC standard, obtained from the conversion from the information 34 in FIG. 9.

FIG. 11 is a drawing illustrating information 37 corresponding to the partition information/motion vector information (input information) encoded by the moving picture encoding apparatus 1 corresponding to partition information/motion vector information 32, and information 38 corresponding to partition information/motion vector information (output information) conforming to the H.264/AVC standard, obtained by the conversion from information 37 according to the motion vector information conversion table 30A.

EXPLANATION OF REFERENCES CHARACTERS 1 moving picture encoding apparatus, 11 inter-frame predictor, 20-1 to 20-N partition divider, 21-1 to 21-N motion vector searcher, 22 partition shape decider, 23 partition connector, 30 connected partition resolver, 30A motion vector information conversion table

BEST MODE OF PRACTICING THE INVENTION (A) First Embodiment

A first embodiment of the motion vector detection apparatus and method, moving picture encoding apparatus and method, and moving picture decoding apparatus and method according to the present invention will now be described with reference to the drawings.

(A-1) Moving Picture Encoding Apparatus in the First Embodiment

Figure 2:
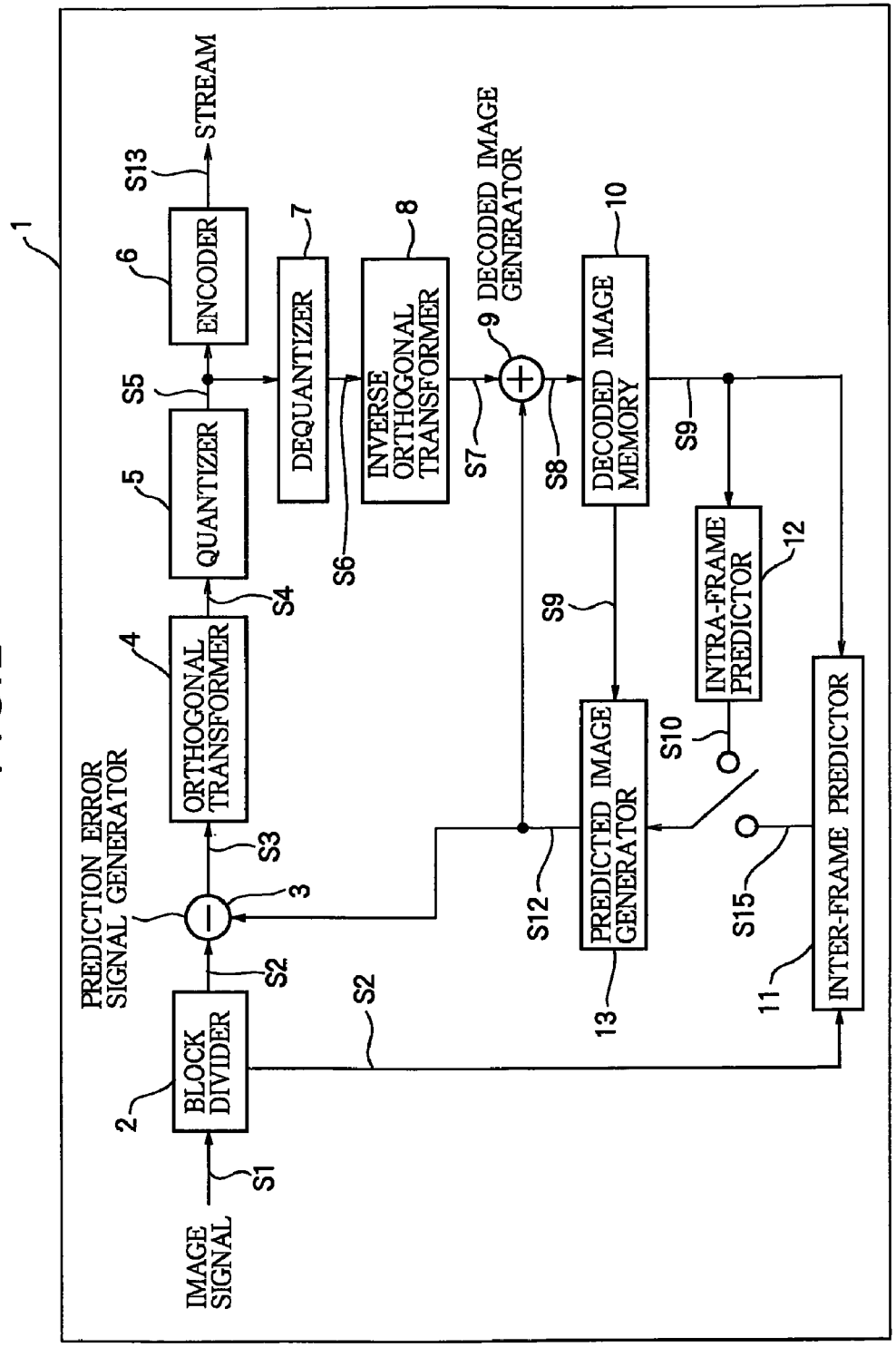
FIG. 2 is a block diagram illustrating the overall structure of the moving picture encoding apparatus in the first embodiment.

FIG. 2 is a block diagram illustrating the overall structure of the moving picture encoding apparatus 1 in the first embodiment. The moving picture encoding apparatus 1 in the first embodiment generally conforms to, for example, the H.264/AVC standard.

The moving picture encoding apparatus 1 in FIG. 2 includes a block divider 2, a prediction error signal generator 3, an orthogonal converter 4, a quantizer 5, an encoder 6, a dequantizer 7, an inverse orthogonal converter 8, a decoded image generator 9, a decoded image memory 10, an inter-frame predictor 11, an intra-frame predictor 12, and a predicted image generator 13.

The block divider 2 divides an image signal S1 into 16-by-16-pixel rectangular blocks called macroblocks (and referred to as macroblocks below), and obtains image data S2 of the macroblock size. The prediction error signal generator 3 obtains a prediction error signal S3 from the image data S2 of the macroblock size and a predicted image S12 supplied from the predicted image generator 13. The orthogonal converter 4 performs orthogonal conversion processing on the prediction error signal S3 and obtains a prediction error signal S4 converted to the frequency domain. The quantizer 5 quantizes the prediction error signal S4 converted to the frequency domain and obtains a quantized prediction error signal S5 that has been converted to the frequency domain. The encoder 6 entropy-encodes the quantized prediction error signal S5 and encoded information that is not shown (for example, information related to motion compensation; see FIGS. 5(A) and 5(B)) to obtain a stream S13. The stream S13 is sent as an output from the moving picture encoding apparatus 1, and is received by, for example, a moving picture decoding apparatus not shown in FIG. 2.

Figure 3:
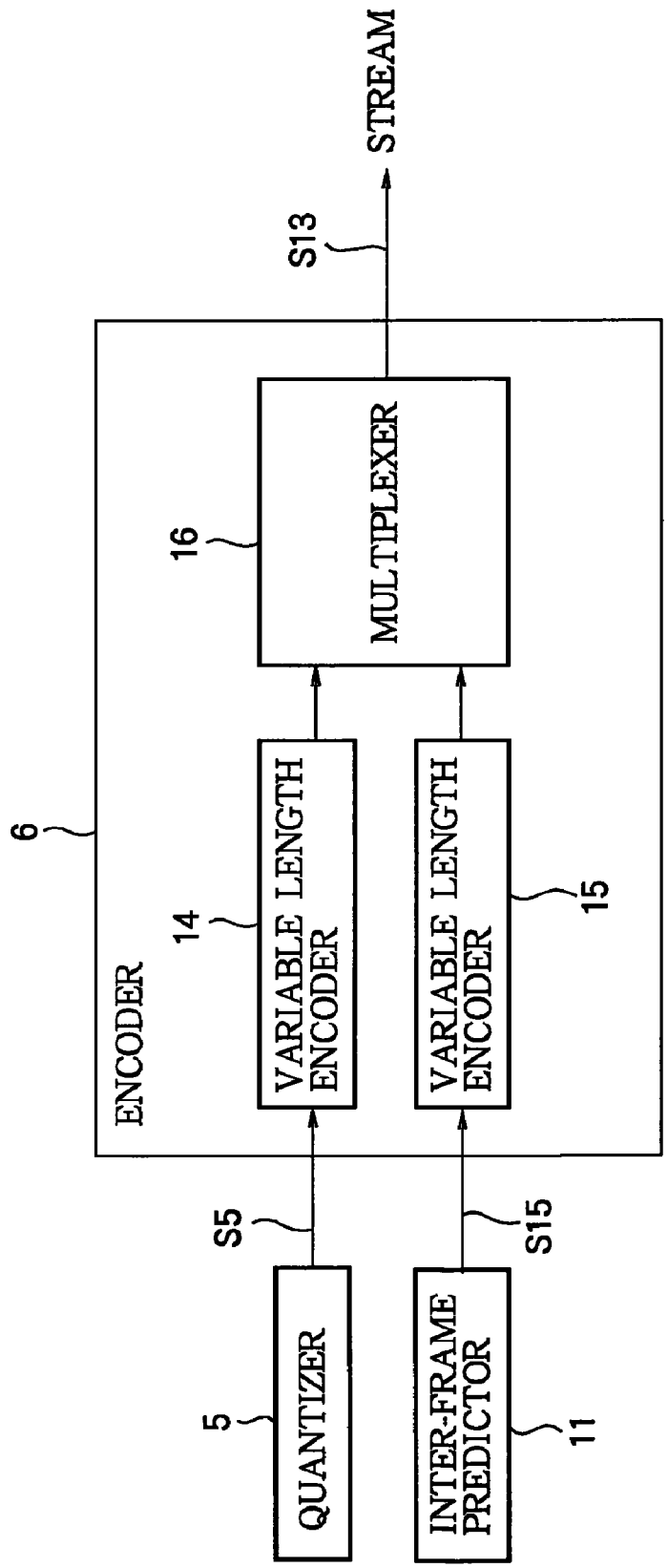
FIG. 3 is a block diagram illustrating an example of the structure of the encoder 6.

An exemplary structure of the encoder 6 is shown in FIG. 3. The illustrated encoder 6 includes a variable length encoder 14, another variable length encoder 15, and a multiplexer 16. The encoder 6 receives the quantized prediction error signal S5 and prediction information S15 as input signals; the prediction information S15 includes motion vectors and other information, described later. The encoder 6 entropy-encodes the quantized prediction error signal with variable length encoder 14, and entropy-encodes the motion vector and other prediction information with variable length encoder 15. The encoder 6 multiplexes the entropy-encoded quantized prediction error signal and the entropy-encoded motion vector and other prediction information in the multiplexer 16. The encoder 6 outputs the stream S13 as an output signal.

In an exemplary structure of the moving picture decoding apparatus, not shown in FIG. 3, the entropy-encoded quantized prediction error signal and the entropy-encoded motion vector and other prediction information are separated from the received stream S13. The moving picture decoding apparatus entropy-decodes the entropy-encoded quantized prediction error signal and the entropy-encoded motion vector and other prediction information from the separated signals. The moving picture decoding apparatus uses the decoded quantized prediction error signal and the decoded motion vector and other prediction information to output a decoded moving picture by a predetermined processing sequence.

The dequantizer 7 dequantizes the quantized prediction error signal S5 and obtains a prediction error signal S6 that has been converted to the frequency domain and includes quantization error. The inverse orthogonal converter 8 performs an inverse orthogonal conversion on the prediction error signal S6 and obtains a prediction signal S7 including quantization error. The decoded image generator 9 obtains a decoded image S8 from the prediction error signal S7 and the predicted image S12.

The decoded image memory 10 stores a decoded image S8 that has already been encoded and locally decoded. The stored decoded image S8 is read out as a reference image S9. In the H.264/AVC standard, the image to be referenced for motion compensation is not limited to the image immediately preceding the image currently being encoded (the image undergoing encoding); a plurality of images with mutually differing timestamps (images in different frames positioned before and after the current image (frame)) may be used as reference images.

The inter-frame predictor 11 obtains the motion vector and other prediction information S15 from the image data S2 of macroblock size in the frame with a timestamp Tn, which is the image data to be encoded, and obtains the reference image S9 from a frame with a timestamp Tk different from timestamp Tn (Tk≠Tn). A motion vector is a value that indicates a spatial displacement between a block (not necessarily of macroblock size) in the reference image (reference region) S9 and a block in the current image data (region undergoing processing) S2. An exemplary method of determining the reference image (reference region) most similar to the current image data S2 is the block matching method. The motion vector information obtained by the inter-frame predictor 11 is supplied to the encoder 6.

From the image data S2 of macroblock size in the frame with timestamp Tn that is undergoing encoding and reference images spatially near the macroblock to be encoded in the frame with the same timestamp Tn, the intra-frame predictor 12 determines a prediction method and outputs a signal S10 indicating the determined prediction method.

Intra-frame prediction corresponds to the predictive encoding of each block by use of previously encoded pixel data in the same frame; in H.264/AVC (e.g., vertical intra-frame prediction, horizontal intra-frame prediction, and mean value intra-frame prediction) only the pixels in the row and column adjacent to the block to be encoded are used.

More specifically, it is necessary to determine which of the adjacent pixels to use (the pixels in which direction to use, for each pixel in the block to be encoded), what operation to perform (just to use the value of the adjacent pixel, or to take the mean value of a plurality of pixels), and what sizes of blocks to encode, and it also necessary to perform special processing for blocks on the upper and left edges. These details of the predictive encoding process are specified by the above (signal indicating the) prediction method S10.

In intra-frame prediction, the predicted image generator 13 performs intra-frame prediction and generates the predicted image S12 from the reference image S9 and prediction method S10; in inter-frame prediction, the predicted image generator 13 performs inter-frame prediction and generates the predicted image S12 from the reference image S9 and prediction information S15.

Whether to perform intra-frame prediction or inter-frame prediction is decided by a method such as, for example, selecting whichever yields the smaller absolute value of the image residual, with respect to the reference image (reference region), of the block to be encoded.

Figure 1:
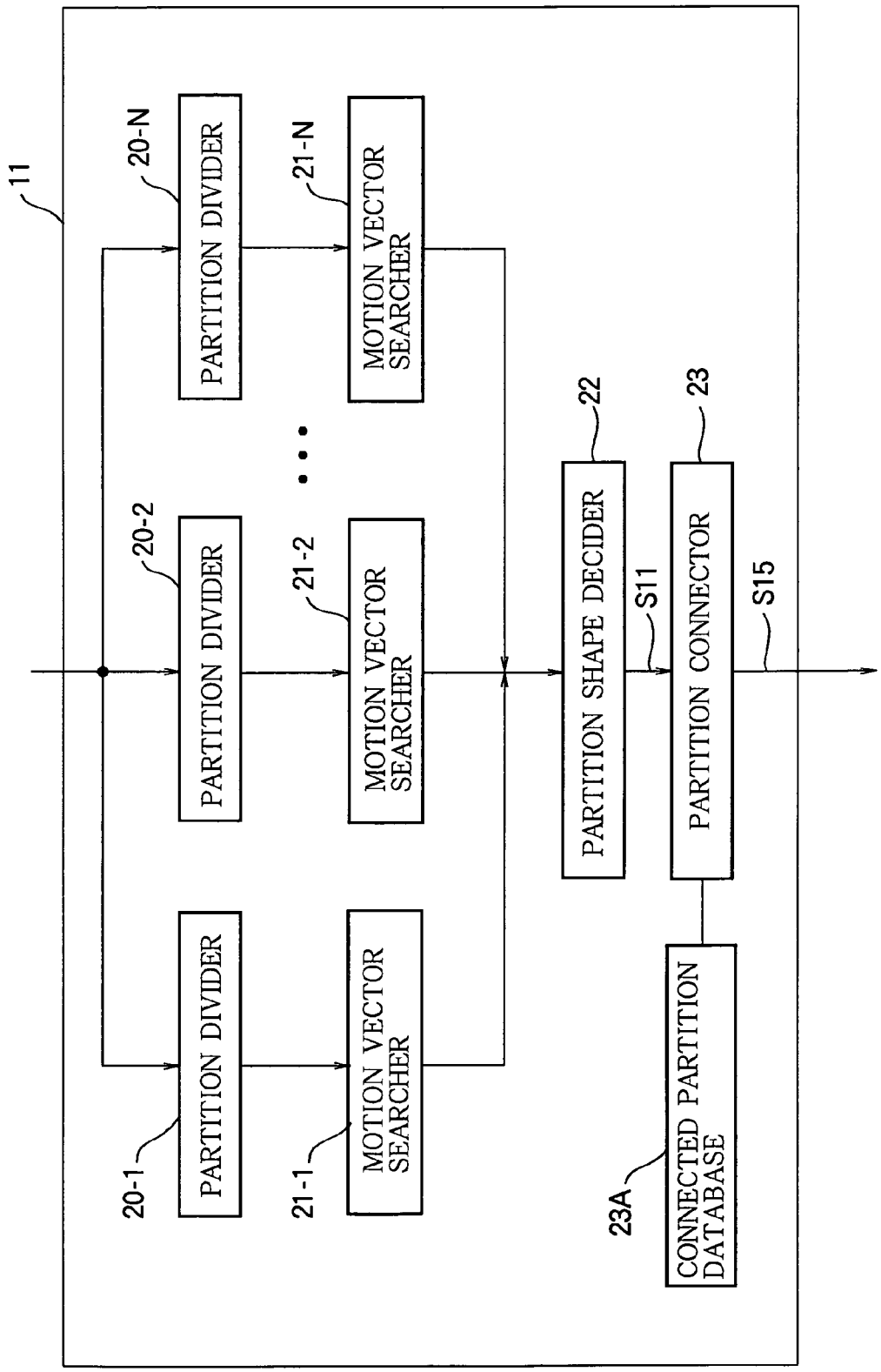
FIG. 1 is a block diagram illustrating the main structure of the inter-frame predictor in a first embodiment.

FIG. 1 is a block diagram illustrating the main structure of the inter-frame predictor 11 in the first embodiment; the motion vector detection method will be explained below in the description of the motion vector searchers 21-1 to 21-N (motion vector detection will be referred to as motion vector search below).

In FIG. 1, the inter-frame predictor 11 has N partition dividers 20-1 to 20-N, N motion vector detectors 21-1 to 21-N, a partition shape decider 22, and a partition connector 23 (N is seven if the predictor conforms to the H.264/AVC standard, and N will be seven in part of the description below).

Each of the partition dividers 20-1 to 20-7 divides the 16-by-16-pixel macroblock for which motion vectors are to be detected into assigned partitions (rectangular blocks) of one of the sizes defined in the H.264/AVC standard. For example, partition dividers 20-1 to 20-7 divide macroblocks into partitions of seven respectively assigned sizes: 16 by 16 pixels, 16 by 8 pixels, 8 by 16 pixels, 8 by 8 pixels, 8 by 4 pixels, 4 by 8 pixels, and 4 by 4 pixels. Since the partition size assigned to partition divider 20-1 equals the macroblock size, partition divider 20-1 may be omitted.

An 8-by-8-pixel block, which is referred to as a sub-macroblock, may here be further divided into 8-by-4-pixel, 4-by-8-pixel, or 4-by-4-pixel partitions.

The motion vector searchers 21-1 to 21-7 search for motion vectors for each partition into which the macroblock is divided by the corresponding partition dividers 20-1 to 20-7.

In an exemplary search method, a predetermined plurality of pictures (pictures to be searched) before and after the picture including the partition to be processed are searched to find the most similar regions (having shapes identical to the shape of the partition being processed).

For example, the most similar region in each of the plurality of pictures is extracted, and the region with the highest similarity is extracted from among the most similar regions in the plurality of pictures.

As similarity, the sum of the absolute values of the differences between the pixels in the partition being processed and the pixels at the corresponding positions in the region being examined is calculated for the totality of the partition being processed, and a smaller total sum (sum of absolute differences) is regarded as indicating a greater similarity.

As motion of a partition of its respective shape, each of the motion vector searchers 21-1 to 21-7 obtains information (a reference picture number) indicating the picture including the region (reference region) for which the sum of the absolute difference values is the smallest, and the relative position of the reference region with respect to the partition (motion compensation region) being processed.

Instead of the sum of the absolute values of the above differences, the sum of the squares of the above differences may be obtained.

Motion vector searchers 21-1 to 21-4 separately perform the above processing, thereby obtaining a reference picture and motion vector for each assigned partition.

Motion vector searchers 21-5 to 21-7 use the most similar region in the reference picture obtained by motion vector searcher 21-4 as the reference region.

Motion vector searchers 21-5 to 21-7 thus process 8-by-4-pixel blocks, 4-by-8-pixel blocks, and 4-by-4-pixel blocks, which are smaller than the sub-macroblocks, and determine the reference picture for each sub-macroblock.

Based on the search results of the motion vector searchers 21-1 to 21-7, the partition shape decider 22 determines which combination of partitions to use for the motion vector information for the macroblock that is undergoing motion vector detection.

For example, if the sum SADa (determined by motion vector searcher 21-1, for example) of absolute difference values for the 16-by-16-pixel partition shown in FIG. 4(A) is less than a first threshold value THa (threshold value for 16-by-16-pixel partitions), the output of motion vector searcher 21-1 is taken as the motion vector information.

If the sum SADa of absolute difference values determined for the 16-by-16-pixel partition is equal to or greater than the first threshold value Tha, whether the motion vector information obtained for the 16-by-8-pixel partitions shown in FIG. 4(B) or the motion vector. information obtained for the 8-by-16-pixel partitions shown in FIG. 4(C) can be taken as the output information is determined.

For example, if the two sums SADb1 and SADb2 (obtained by motion vector searcher 21-2, for example) of absolute difference values for the two 16-by-8-pixel partitions shown in FIG. 4(B) are both less than a second threshold value THb (a threshold value for 16-by-8-pixel partitions), and if the total (SADb1+SADb2) of the two sums of absolute difference values is less than the total (SADc1+SADc2) (obtained by motion vector searcher 21-3, for example) of the two sums of absolute difference values for the 8-by-16-pixel partitions shown in FIG. 4(C), the motion vector information obtained for the 16-by-8-pixel partitions shown in FIG. 4(B) is taken as the output information.

If each of the two sums, SADc1 and SADc2, of absolute difference values obtained for the 8-by-16-pixel partitions shown in FIG. 4(C) is less than the second threshold value THb, and if the total (SADc1+SADc2) of the two sums of absolute difference values is less than the total (SADb1+SADb2) of the two sums of absolute difference values obtained for the 16-by-8-pixel partitions shown in FIG. 4(B), the motion vector information obtained for the 8-by-16-pixel partitions shown in FIG. 4(C) is taken as the output information.

If none of the motion vector information determined for the partitions shown in FIGS. 4(A) to 4(C) can be taken as the output information, motion vector information is obtained for each of the 8-by-8 sub-macroblocks shown in FIG. 4(D). There are also four determination methods for each sub-macroblock: one using the 8-by-8-pixel partition shown in FIG. 4(E), one using the 8-by-4-pixel partitions shown in FIG. 4(F), one using the 4-by-8-pixel partitions shown in FIG. 4(G), and one using the 4-by-4-pixel partitions shown in FIG. 4(H), the decision proceeding to a smaller partition when a larger partition cannot be used.

The macroblock in FIG. 4(D) consists of four sub-macroblocks, and there are four partitioning patterns, shown in FIGS. 4(E) to 4(H), for each sub-macroblock, so when these motion vectors are determined for a macroblock, there are 256(=$4^4$) partitioning patterns in total. In addition, one of the patterns shown in FIGS. 4(A) to 4(C) may be used, so in all there are 259(=256+3) partitioning patterns available to the partition shape decider 22.

As described above, for the partitions shown in FIGS. 4(A) to 4(H), the motion information for the partition shown in FIG. 4(A) is output from motion vector detector 21-1; the motion information for the partitions shown in FIG. 4(B) is output from motion vector detector 21-2; the motion information for the partitions shown in FIG. 4(C) is output from motion vector detector 21-3; as the motion information for the partitions shown in FIG. 4(D), one of FIGS. 4(E) to 4(H) is selected for each of the 8-by-8-pixel blocks 0 to 3; the motion information for the partition shown in FIG. 4(E) is output from motion vector detector 21-4; the motion information for the partitions shown in FIG. 4(F) is output from motion vector detector 21-5; the motion information for the partitions shown in FIG. 4(G) is output from motion vector detector 21-6; the motion information for the partitions shown in FIG. 4(H) is output from motion vector detector 21-7. The information output from motion vector searchers 21-5 to 21-7 to indicate the reference picture is generated in motion vector searcher 21-4.

Figure 5A:
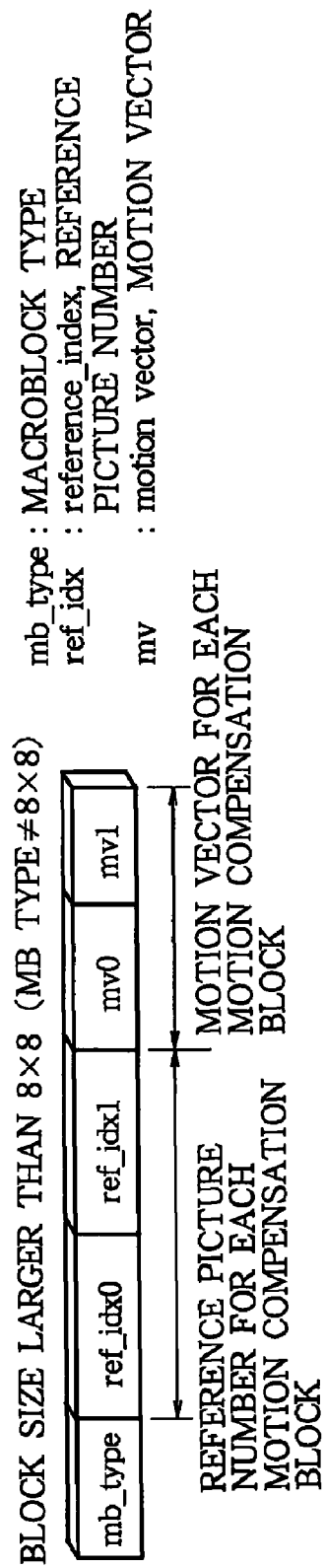
FIGS. 5(A) and 5(B) are drawings illustrating the notation system for motion vector information inserted into transmitted information by the H.264/AVC standard.
Figure 5B:
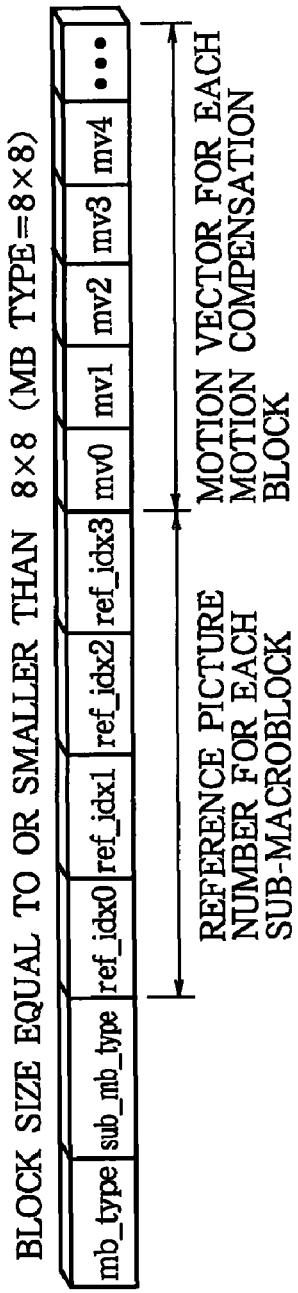

FIGS. 5(A) and 5(B) are drawings illustrating the notation by which the motion vector information inserted into information transmitted according to the H.264/AVC standard is designated: FIG. 5(A) illustrates the notation when there is no sub-macroblock motion vector information (FIGS. 4(A) to 4(C)); FIG. 5(B) illustrates the notation when there is motion vector information for sub-macroblocks (FIG. 4(D)).

In FIGS. 5(A) and 5(B), mb_type indicates the macroblock type, designating one of the types shown in FIGS. 4(A) to 4(D).

If one of FIGS. 4(A) to 4(C) is used, then as shown in FIG. 5(A), the motion vector information consists of the macroblock type mb_type designating one of the types shown in FIGS. 4(A) to 4(C), the reference picture information ref_idxi (i=0, 1) for each partition, and the motion vectors mvj (j=0, 1).

FIG. 5(A) indicates the notation for FIGS. 4(A) to 4(C), which have one or two partitions.

In FIG. 5(A), the indices i, j(=0, 1) following ref_idx and mv correspond to the partition. FIG. 4(A) includes a single partition, so just ref_idx0 and mv0 are used.

If FIG. 4(D) is used, then as shown in FIG. 5(B), the motion vector information consists of the macroblock type mb_type indicating the type shown in FIG. 4(D), the sub-macroblock type sub_mb_type indicating one of the sixteen combinations of sub-macroblocks, the reference picture information ref_idxi (i=0 to 3), and the motion vectors mvj (j=0, 1, 2, 3, 4, ... ).

In FIG. 5(B), the index i(=0 to 3) of ref_idx corresponds to the sub-macroblock, and the index j(=0, 1, 2, 3, 4, ... ) corresponds to the partition.

In the first embodiment, the partition dividers 20-1 to 20-7, the seven motion vector searchers 21-1 to 21-7, and the partition shape decider 22 described above are structured as in the prior art, but the information output from the partition shape decider 22 is provided to the partition connector 23 instead of the encoder 6 (FIG. 2). The partition shape decider 22 provides motion vector information conforming to FIGS. 5(A) and 5(B), for example, to the partition connector 23.

When the information output from the partition shape decider 22 is as shown in FIG. 5(A) (when the macroblock is partitioned as shown in one of FIGS. 4(A) to 4(C)), the partition connector 23 outputs the information without change; when the information output from the partition shape decider 22 is as shown in FIG. 5(B) (when the macroblock is partitioned as shown in FIG. 4(D) and each of the four 8-by-8-pixel blocks is partitioned as shown in one of FIGS. 4(E) to 4(H)), the partition connector 23 connects partitions, restructures the motion vector information based on the connection result, and outputs the restructured motion vector information. The partitions that are connected are partitions having reference images with the same timestamp (the same reference picture) and motion vectors with the same magnitude and direction.

A connected partition database 23A, in which the macroblock type mb_type corresponding to the structure of the connected partitions and the structure of the motion vector information to be output are indicated, is provided in association with the partition connector 23. The partition connector 23 restructures the motion vector information by referring to the connected partition database 23A.

Figure 6:
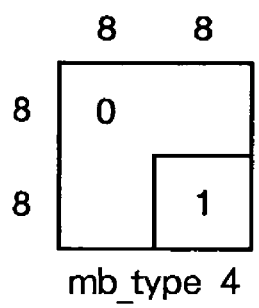
FIGS. 6(A) to 6(E) are drawings illustrating a database for connected partitions in the first embodiment.
Figure 6:
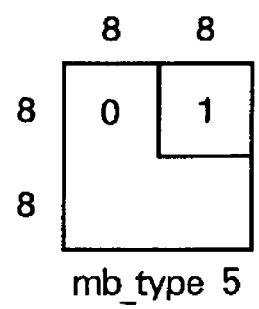
Figure 6:
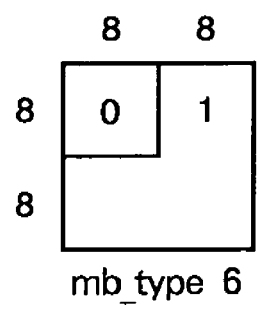
Figure 6:
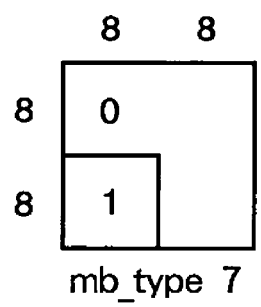
Figure 6:
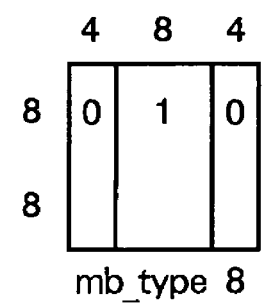

FIGS. 6(A) to 6(E) show exemplary connected partitions stored in the connected partition database 23A for a P-slice (a slice for which prediction is performed from one reference image). A similar connected partition database is prepared for a B-slice (a slice for which prediction is performed from two reference images). FIG. 6(A) shows a case in which the motion vector (including the reference image information) in the 8-by-8-pixel region in the lower right differs from the motion vector in the rest of the region. In this connected partition structure, '4' is assigned as the macroblock type mb_type, reference picture information ref_idxi is given in order from partition (region) 0 to partition (region) 1, and motion vectors mvj are given in order from partition (region) 0 to partition (region) 1. The examples in FIGS. 6(B) to 6(E) are similar. The macroblock type mb type given in the connected partition database 23A is original to the first embodiment and does not conform to the H.264/AVC standard.

Figure 7B:
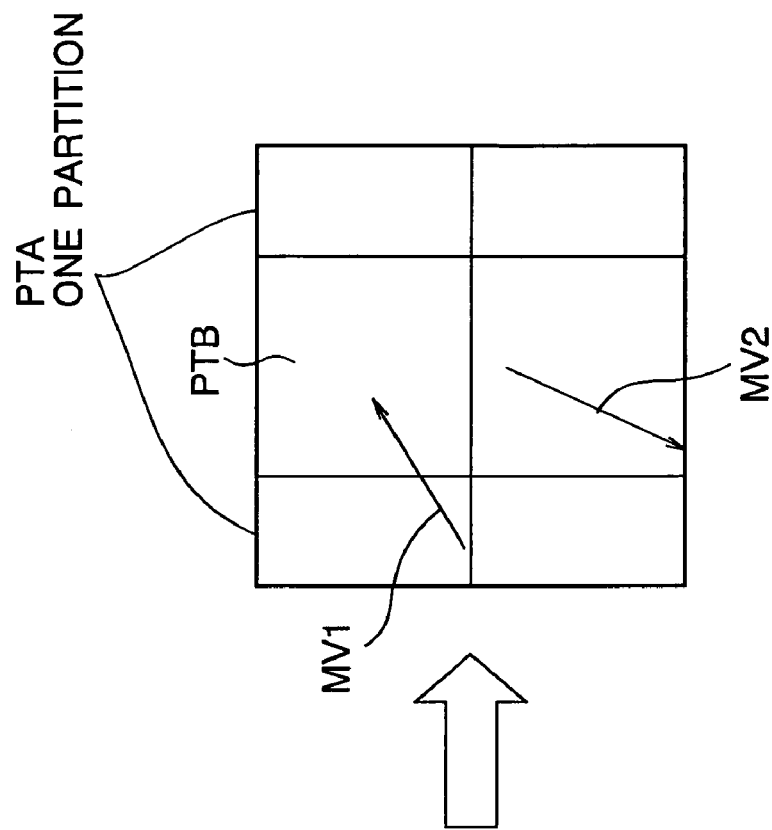
FIGS. 7(A) and 7(B) are drawings illustrating the operation of the partition connector.
Figure 7A:
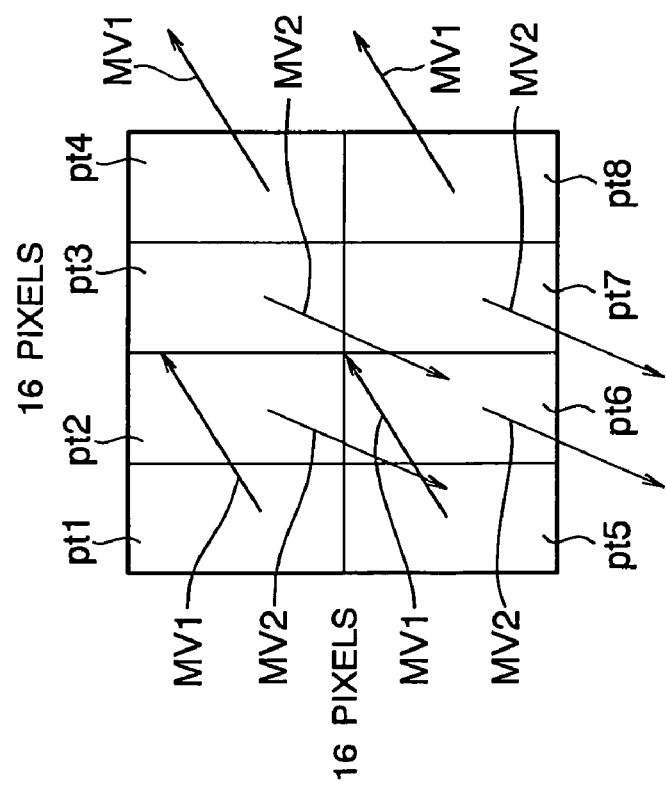

When the information from the partition shape decider 22 is as shown in FIG. 7(A), for example, four 4-by-8-pixel partitions pt1, pt4, pt5, and pt8 having mutually identical reference pictures and mutually identical motion vectors indicated as MV1 are connected and transformed to the partition PTA shown in FIG. 7(B), while four 4-by-8-pixel partitions pt2, pt3, pt6, and pt7 having mutually identical reference picture and mutually identical motion vectors indicated as MV2 are connected and transformed to the partition PTB shown in FIG. 7(B). When the connected partition database 23A is searched by transformed partition shape, the connected partition structure shown in FIG. 6(E) is found to match, '8' is given as the macroblock type mb_type for this connected partition structure, the reference picture information, first for partition (region) PTA and then for partition (region) PTB is given as ref_idxi (i=0, 1), and the motion vectors MV1 and MV2 for partitions (regions) PTA and PTB are given in the same order as mvj (j=0, 1).

The restructured motion vector information 32 corresponds to the prediction information S15 described above, including the motion vectors, and is similar to the information shown in FIG. 5(A), including information indicating the connected partition structure and information indicating a motion vector for each partition, but does not include information indicating sub-macroblocks.

As described above, the moving picture encoding apparatus 1 in the first embodiment is capable of reducing the encoding rate for motion vector information for a macroblock that would have a large number of partitions in the H.264/AVC standard.

The number of bits indicating the macroblock type mb_type may be constant; alternatively, fewer bits may be used to indicate the macroblock type for the connected partition structure as the number of partitions decreases.

(A-2) Moving Picture Decoding Apparatus in the First Embodiment

The overall structure of the moving picture decoding apparatus according to the first embodiment is almost the same as the general structure conforming to the H.264/AVC standard.

The moving picture decoding apparatus according to the first embodiment differs from general moving picture decoding apparatus conforming to the H.264/AVC standard in that the received motion vector information (see FIGS. 5(A) and 5(B), and FIGS. 6(A) to 6(E)) is input to the motion compensated decoded image generator 31 via a connected partition resolver 30, as shown in FIG. 8, instead of being input directly.

When the macroblock type mb_type in the input motion vector information indicates one of the types shown in FIGS. 4(A) to 4(C), the connected partition resolver 30 outputs the motion vector information to the motion compensated decoded image generator 31 without alteration. When the macroblock type mb type in the input motion vector information indicates a type such as one of the types shown in FIGS. 6(A) to 6(E), however, the connected partition resolver 30 converts the motion vector information to information conforming to the H.264/AVC standard as shown in FIG. 5(B), and outputs the converted information to the motion compensated decoded image generator 31. In terms of partitions, this conversion operation converts connected partitions of types such as the types shown in FIGS. 6(A) to 6(E) to the sub-macroblock partition structure shown in FIG. 4(D).

A motion vector information conversion table 30A, in which the input information is related to the output information, is provided in association with the connected partition resolver 30. The output information has a format conforming to FIG. 5(B) in which values are inserted into the macroblock type mb_type and the sub-macroblock type sub_mb_type, indicating which field value in the input information is to be taken and inserted into the reference picture information field ref_idxi (i=0 to 3) for each sub-macroblock, and into the motion vector field mvj (j=0, 1, 2, 3, 4, . . . ) for each partition.

Accordingly, the connected partition resolver 30 converts the partition information/motion vector information (indicated by reference number '32') shown in FIG. 7(B), for example, to the partition information/motion vector information (indicated by reference number '33') shown in FIG. 7(A). More specific examples of the conversion from the partition information/motion vector information 32 in FIG. 7(B) to the partition information/motion vector information 33 in FIG. 7(A) are shown in FIGS. 9 and 10. In FIG. 8, the connected partition resolver 30 receives the motion vector information (input information) 34 shown in FIG. 9, which has been encoded by the motion picture encoding apparatus 1, converts the motion vector information 34 to the motion vector information (output information) 35 shown in FIG. 10, conforming to the H.264/AVC standard, by referring to the motion vector information conversion table 30A, and outputs the obtained information.

As shown in FIG. 9, the input information 34 input to the connected partition resolver 30 is stored in order of 'mb_type', indicating the partition shape (macroblock type), 'ref_idx', indicating the reference picture information (reference image index) for each partition, and 'mv', indicating the motion vector for each partition.

In the connected partition resolver 30, the number of 'ref_idx' items and the number of 'mv' items in the input information vary depending on the partition shape.

In the example shown in FIG. 9, 'mb_type' is '8'; there is one 'ref_idx', and this 'ref_idx0' is 0; there are two 'mv' items, of which 'mv0' is 'MV1' and 'mv1' is 'MV2.

The '0' value of 'ref_idx0' means the reference picture just before the encoded picture.

The motion vector information conversion table 30A is used as described below in conversion from the partition information/motion vector information 32 shown in FIG. 7(B) to the partition information/motion vector information 33 shown in FIG. 7(A).

With the motion vector information table 30A, from the partition shape (macroblock type) 'mb_type' in the information 37 (FIG. 11) corresponding to the motion vector information (input information) encoded by the motion picture encoding apparatus 1 and corresponding to the partition information/motion vector information 32, conversion is performed by using (TBY1) the partition shape (macroblock type) 'mb_type' in the information 38 corresponding to the motion vector information (output information) conforming to the H.264/AVC standard, (TBY2) the sub-macroblock type 'sub_mb_type' given when macroblock type mb type conforming to the H.264/AVC standard is '3', indicating 8-by-8-pixel blocks, and (TBY3) the correspondence relationship between the partition shape 'pt' of this macroblock type or sub-macroblock type and the partition shape 'PT' in the information corresponding to the motion vector information (input information) 34 encoded by the moving picture encoding apparatus 1 and corresponding to the partition information/moving vector information 32.

More specifically, the motion vector information conversion table 30A first indicates, by 'mb_type', to what output information 35 the information corresponding to the input information 34 'mb_type'='8' corresponds, and then indicates which of the types shown in FIGS. 4(E) to 4(H) the partition shapes of sub-macroblock 0 to sub-macroblock 3 corresponding respectively to positions 0 to 3 in FIG. 4(D) assume (what output information 35 corresponds to 'sub_mb_ type'='0 to 3').

When the 'mb_type' information corresponding to the output information 35 is '3' (FIG. 4(D)), the 'sub_mb_type' information corresponding to the output information 35 includes four sub-macroblocks, and the four sub-macroblocks are all indicated to be of type '2' (FIG. 4(G)).

With the motion vector information conversion table 30A, conversion is performed by use of the correspondence relationship between the partition shape ('PTA' or 'PTB') in the information corresponding to the input information 34 and the information corresponding to the output information 35 for each partition; there are two partition shapes 'pt1' and 'pt2' corresponding to 'sub_mb_type'='2' (FIG. 4(G)) for sub-macroblock 0, two partition shapes 'pt3' and 'pt4' corresponding to 'sub_mb_type'='2' (FIG. 4(G)) for sub-macroblock 1, two partition shapes 'pt5' and 'pt6' corresponding to 'sub_mb_type'='2' (FIG. 4(G)) for sub-macroblock 2, and two partition shapes 'pt7' and 'pt8' corresponding to 'sub_mb_type'='2' (FIG. 4(G)) for sub-macroblock 3, as shown next.

'pt1' is included in 'PTA'.
'pt2' is included in 'PTB'.
'pt3' is included in 'PTB'.
'pt4' is included in 'PTA'.
'pt5' is included in 'PTA'.
'pt6' is included in 'PTB'.
'pt7' is included in 'PTB'.
'pt8' is included in 'PTA'.

Based on the motion vector information conversion table, the connected partition resolver 30 generates motion vector information (output information) 35 conforming to the H.264/AVC standard from the motion vector information (input information) 34 encoded by the motion picture encoding apparatus 1.

As shown in FIG. 5(B), the output information 35 is stored in the following order: 'mb_type', indicating the partition shape (macroblock type); 'sub_mb_type', indicating the macroblock partition shape (sub-macroblock type); 'ref_idx' indicating the reference picture information (reference image index) for each partition; and the motion vector 'mv' for each partition in the macroblock or sub-macroblock.

A decision is made as to in which partition conforming to the H.264/AVC standard the partitions in each macroblock or sub-macroblock are included, and the reference image index 'ref_idx' corresponding to those partitions is used.

In this output information 35, the four sub-macroblocks have the same reference image, so the same value is assigned to all of the values corresponding to the reference images in the output information 34.

Accordingly, the output information 35 conforming to the H.264/AVC standard in this example is as follows.

'mb_type'→'3'
'sub_mb_type: 0'→'2'
'sub_mb_type: 1'→'2'
'sub_mb_type: 2'→'2'
'sub_mb_type: 3'→'2'
'ref_idx0'→'0'
'ref_idx1'→'0'
'ref_idx2'→'0'
'ref_idx3'→'0'
'mv0'→'MV1'
'mv1'→'MV2'
'mv2'→'MV2'
'mv3'→'MV1'
'mv4'→'MV1'
'mv5'→'MV2'
'mv6'→'MV2'
'mv7'→'MV1'

Compared with the H.264/AVC standard, the first embodiment has more macroblock types mb_type. The connected partition resolver 30 may be omitted; when motion vector information related to connected partitions is input, the motion compensated decoded image generator 31 may obtain regions of the corresponding partition shapes from the corresponding reference image and use those regions as decoded image regions by shifting the regions according to the motion vectors. This method, however, would require alteration of an existing motion compensated decoded image generator 31 conforming to the H.264/AVC standard. The motion picture decoding apparatus according to the first embodiment provides the connected partition resolver 30 so that an existing motion compensated decoded image generator 31 conforming to the H.264/AVC standard can be used without alteration.

(A-3) Effects of the First Embodiment

According to the first embodiment, since partitions are connected and motion vector information related to the connected partitions is sent from the motion picture encoding apparatus and received by the motion picture decoding apparatus, the average amount of code related to motion compensation can be reduced. In other words, the compression efficiency in the motion encoding apparatus can be improved.

(B) Second Embodiment

A second embodiment of the motion vector detection apparatus and method, moving picture encoding apparatus and method, and moving picture decoding apparatus and method according to the present invention will now be described. FIGS. 1, 2, 8, 9, 10, and 11 relating to the first embodiment can also be regarded, without alteration, as drawings for the second embodiment.

In the first embodiment described above, when connecting partitions based on the motion vector information output from the partition shape decider 22, if there are partitions with the same motion vector and reference image, the partition connector 23 connects these partitions regardless of their positional relationship.

If partitions are connected as in the first embodiment, however, there are very many types of connected partitions. This increases the amount of code used by the macroblock type to designate the connected partitions, which may offset the encoding rate reduction gained from the reduced number of motion vectors obtained by connecting partitions.

For this reason, the second embodiment makes the connecting conditions used by the partition connector 23 more stringent than in the first embodiment, thereby reducing the number of types of connected partitions. The partition connector 23 in the second embodiment restricts the partitions to be connected to, for example, mutually adjacent partitions of identical size.

Figures 12A, 12B:
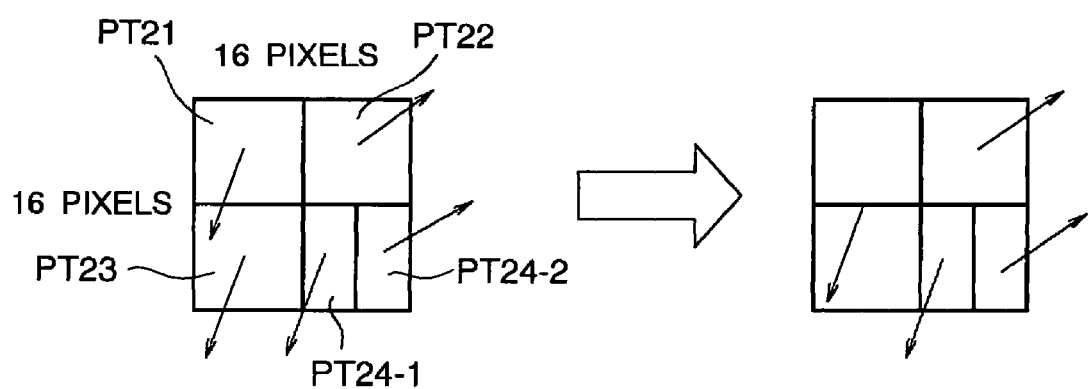
FIGS. 12(A) to 12(C) are drawings illustrating the operation of the partition connector in a second embodiment.
Figure 12C:
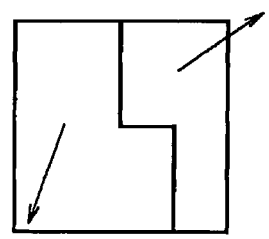

For example, if the output information of the partition shape decider 22 is as shown in FIG. 12(A), partitions PT21 and PT23 have identical motion vectors and are mutually adjacent partitions of identical size, so the partition shape connector 23 connects partitions PT21 and PT23. Partition PT24-1 has the same motion vector as partitions PT21 and PT23, but is not connected because of its differing size. For the same reason, the partition connector 23 does not connect partitions PT22 and PT24-2. As a result, in the second embodiment, the connected partitions are as shown in FIG. 12(B). FIG. 12(C) shows the connected partitions in the first embodiment.

According to the second embodiment, because of the reduced number of types of connected partitions, the amount of encoded data used for identifying the type can be greatly reduced, which enables the reduction in the encoding rate by connecting partitions to be effectively achieved. The time taken for connection processing can also be expected to be shorter than in the first embodiment.

Other Embodiments

Besides the variations mentioned in the embodiments above, the following exemplary variations can be listed.

In the first and second embodiments, equality of the direction and magnitude of the motion vectors was given as a condition for connecting partitions, but it is also possible to allow partitions to be connected under certain conditions even if their motion vectors do not match completely. One example of such a certain condition may be that the difference between the motion vectors is within a threshold value. When a weighted sum of the amounts of motion vector information and partition shape information (an indicator of the encoding rate) is relatively large, the threshold value of the difference described above may be increased, so that motion vectors of comparatively high similarity are regarded as mutually identical and their partitions are connected. In this case, the average or a weighted average of the motion vectors of the partitions before being connected is used as the motion vector of the connected partition.

The above embodiments described an application of the present invention to a motion vector detection apparatus and method, moving picture encoding apparatus and method, and moving picture decoding apparatus and method conforming to the H.264/AVC standard, but the present invention is not limited to this application. For example, the present invention is also applicable when there is one reference picture (no choice). The present invention is also applicable to apparatus using 32-by-32-pixel large blocks (corresponding to macroblocks) and 16-by-16-pixel small blocks (corresponding to sub-macroblocks).

In the embodiments described above the motion vectors for partitions of different sizes were obtained concurrently, but the motion vectors may be obtained sequentially, proceeding from larger partitions to smaller partitions, stopping at the stage where the motion vector information conforming to the H.264/AVC standard has been determined.

The above embodiments have been described as using hardware processing, but the processing may be executed partially or entirely by software.

What is claimed is:

1. A motion vector detection apparatus that obtains, for each of a plurality of blocks of a predetermined size into which one frame is divided, motion vector information in units of a plurality of partitions of differing rectangular shapes and differing sizes, up to the size of the blocks, comprising:
a partition connector that, when motion vectors for a plurality of partitions are obtained for one of the blocks, decides whether or not to connect a plurality of the partitions for which the motion vectors are obtained, and if the partitions are connected, includes motion vector information about the resulting connected partition in motion vector information output from the motion vector detection apparatus,
wherein the motion vector detection apparatus can select a reference image to use from among reference images of a plurality of frames, and
wherein the partition connector connects partitions conditional on the reference images having identical time stamps and differences between directions and magnitudes of the motion vectors being within a predetermined tolerance range.

2. The motion vector detection apparatus of claim 1, wherein:
the partition connector additionally connects partitions conditional on the partitions being mutually adjacent and identical in size.

3. A moving picture encoding apparatus that encodes a moving picture according to a motion compensated interframe encoding method, comprising the motion vector detection apparatus of claim 2.

4. A moving picture decoding apparatus that performs moving picture decoding processing based on encoded information provided by the moving picture encoding apparatus of claim 3, comprising:
a motion compensation decoding means for performing decoding with motion compensation based on the motion vector information; and
a connected partition resolving means for deciding whether or not motion vector information included in the received encoded information is for a connected partition, and if the motion vector information is for a connected partition, for restoring the motion vector information to motion vector information before connection of the partition and supplying the resulting motion vector information to the motion compensation decoding means.

5. A moving picture encoding apparatus that encodes a moving picture according to a motion compensated interframe encoding method, comprising the motion vector detection apparatus of claim 1.

6. A moving picture decoding apparatus that performs moving picture decoding processing based on encoded information provided by the moving picture encoding apparatus of claim 5, comprising:
a motion compensation decoding means for performing decoding with motion compensation based on the motion vector information; and
a connected partition resolving means for deciding whether or not motion vector information included in the received encoded information is for a connected partition, and if the motion vector information is for a connected partition, for restoring the motion vector information to motion vector information before connection of the partition and supplying the resulting motion vector information to the motion compensation decoding means.

* * * * *